United States Patent
Darrieux et al.

[11] Patent Number: 5,571,357
[45] Date of Patent: Nov. 5, 1996

[54] METHOD FOR PRODUCING HOLLOW COMPOSITE ARTICLES BY WINDING/LAYING DOWN ON AN EXPANSIBLE MANDREL

[75] Inventors: Jean-Louis Darrieux, Saint Medard En Jalles; Christian Picosson, Macau; Hugues Canfranc, Saint Aubin De Medoc, all of France

[73] Assignee: Societe Anonyme Dite Aerospatiale Societe Nationale Industrielle, Paris, France

[21] Appl. No.: 253,056

[22] Filed: Jun. 2, 1994

[30] Foreign Application Priority Data

Jun. 14, 1993 [FR] France .................................. 93 07432

[51] Int. Cl.$^6$ .................. B29C 70/20; B29C 70/22; B29C 70/34
[52] U.S. Cl. .................. 156/173; 156/156; 156/175; 156/190; 264/258; 264/314; 264/334
[58] Field of Search .................. 156/175, 173, 156/169, 156, 189, 190; 264/258, 314, 219, 334

[56] References Cited

U.S. PATENT DOCUMENTS

| | | | |
|---|---|---|---|
| 3,033,730 | 5/1962 | Martin | 156/175 |
| 3,316,337 | 4/1967 | North | 156/169 |
| 3,791,900 | 2/1974 | Goerden et al. | 156/175 |
| 3,967,996 | 7/1976 | Kamov et al. | 156/156 |
| 4,469,730 | 9/1984 | Burhans | 156/175 |
| 4,892,772 | 1/1990 | Su | 428/298 |
| 5,192,384 | 3/1993 | Barrier et al. | 156/189 |

FOREIGN PATENT DOCUMENTS

| | | |
|---|---|---|
| 0369395 | 5/1990 | European Pat. Off. . |
| 2550123 | 2/1985 | France . |
| 3408769 | 9/1985 | Germany . |
| 544547 | 4/1942 | United Kingdom . |
| 2040790 | 9/1980 | United Kingdom . |

*Primary Examiner*—Robert Davis
*Attorney, Agent, or Firm*—Greenblum & Bernstein P.L.C.

[57] ABSTRACT

Method for embodying hollow articles made of composite material including at least one access orifice via winding/laying down fibers on an expansible mandrel, the resulting articles and a recoverable and removable mandrel. The method includes placing preimpregnated fibers on an expansible, extractable mandrel having a longitudinal axis by at least one of winding and laying down the preimpregnated fibers on the mandrel, the placing of circumferential fibers of the preimpregnated fibers comprising placing the circumferential fibers at an angle to approach or reach 90° with respect to the longitudinal axis and to form on the mandrel a sinuous line and/or plural, discontinuous elements, so as to enable the preimpregnated fibers to be expanded circumferentially during radial expansion of the mandrel; and expanding the mandrel inside a shaper while polymerizing the preimpregnated fibers.

33 Claims, 6 Drawing Sheets

METHOD FOR PRODUCING HOLLOW COMPOSITE ARTICLES BY WINDING/LAYING DOWN ON AN EXPANSIBLE MANDREL

BACKGROUND OF THE INVENTION

1. Field of the Invention

The present invention concerns the production of hollow articles provided with at least one orifice with access to the inside by means of winding/laying down preimpregnated fibers on an expansible mandrel.

2. Discussion of Background Information

A method is already known how to embody hollow parts, such as connecting rods, formed of preimpregnated fibers placed on an expansible mandrel which is then expanded so as to compress the fibers against the internal wall of a shaper encompassing the mandrel while the resin coating the fibers is polymerized.

FR 2 550 123 describes this technique which, however, only seeks to embody connecting rods with unidirectional fibers and more particularly fibers disposed in the axis of the connecting rod. In fact, owing to the radial expansion of the mandrel, once the fibers have been placed, it is impossible to wind, especially circumferentially, the fibers on the mandrel. The excessive weak elasticity of the fibers, normally carbon fibers, and their extreme resistance would prevent the mandrel from expanding.

SUMMARY OF THE INVENTION

The object of the present invention is, in particular, to mitigate the drawbacks of this technique by enabling parts to be embodied having wound fibers or laid down circumferentially or forming with the axis of the mandrel an angle ranging of between 0° and 90°.

To this effect, the invention concerns a method for embodying hollow articles made of a composite material provided with at least one access orifice via the winding/laying down on an expansible mandrel, wherein preimpregnated fibers are placed on an expansible mandrel which is extractable and possibly able to be recovered, followed by expansion effected inside a suitable shaper when polymerizing the composite material, and wherein the fibers are wound and/or laid down thus forming on the mandrel together with the axis of the latter a suitable angle able to approach or reach 90° for the circumferential fibers, the latter forming on the mandrel a sinuous line or formed of discontinuous elements so as to enable the fibers to expand circumferentially upon radial expansion of the mandrel.

A fiber is understood to be a bundle of agglomerated continuous filaments able to form a strip or a bundle of discontinuous overlapped filaments of the wool yarn type.

In winding, the fiber is individual, although several fibers may be wound simultaneously, but when laid down, the fiber may be a single fiber or constituting one of the elements (weft yarn or ward yarn) of a woven weft.

In the case of a single fiber, the fiber may be wound by giving it a certain amount of slack, that is so that it circumferentially forms at the mandrel at the location of contact with the latter a sinuous line, such as a sinusoid. This winding is easy to implement by stressing the winding head to a periodic lateral excursion with respect to the normal winding position.

The characteristics of this sinusoidal line, namely amplitude and Ditch, may vary according to the nature of the fiber, the bending radius of the surface on which the fiber is wound and the distance to the spin axis of the mandrel from the layer of fibers concerned.

Given the fact that during the radial expansion of the mandrel compressing the stacking of layers of wound fibers against the internal wall of the shaper, the concentric layers shall be compressed or packed most when they are most distant from the outer layer, the sinusoidal winding being effected with, for example, a greater undulation amplitude for those layers closest to the mandrel.

The characteristics of the undulations of the fiber according to the row of the layer thus vary advantageously, this advantage being easily able to be determined via calculation and being automatically implemented by an order controlled by a computer of the winding head so that, once the mandrel has fully expanded, all the circumferential or approximately circumferential fibers of all the layers would have lost their sinuosity and recover their purely helical nature as if they had been wound normally without any undulations.

Again, in the case of a single fiber, the latter may be placed by winding or laying down via end to end circumferential sections or partial covering, each section extending over a complete or almost complete turn or a fraction of a turn.

Thus, when the mandrel is expanded, the circumferential sections of fibers could follow the movement with a slight relative displacement in the direction of the fiber.

If this fiber is a "wool yarn" or rough roving type fiber, placing is effected via normal winding, given the fact that on expansion of the mandrel, the overlapped filaments constituting the fiber could unbend themselves with respect to one another in the direction of the fiber.

Finally, if the fibers constitute, for example, the warp yarns of a fabric, pieces of the fabric are cut to suitable sizes and shapes which are then draped onto the mandrel so that the warp yarns of said pieces are disposed circumferentially to the mandrel, it being understood that, as in the previous case, the warp yarns of a piece extend over a complete turn of the mandrel or a fraction of a turn with the overlapping or end-to-end placing of the fabric pieces.

This method is able to embody hollow articles with wound and/or laid down fibers comprising an outer profile having dimensional and surface quality characteristics able to satisfy extremely strict specifications.

The method of the invention is more particularly, but not exclusively, applicable to the embodiment of hollow connecting rods with straps possessing a remarkable surface quality and free from roughness defects or crumpled fibers.

When producing these types of connecting rods, the expansible mandrel, possibly able to be extracted and recovered, is preferably constituted by an assembly, able to be dismantled like a three-dimensional puzzle, of parts whose shapes and dimensions are determined so that, after polymerization, parts per passage may be extracted according to a pre-established sequence along either of the orifices for access to the inside of the connecting rod at either of its ends, this mandrel being conventionally covered with an inflatable bladder on which the fibers are to be placed.

BRIEF DESCRIPTION OF THE DRAWINGS

Other characteristics and advantages shall appear more readily from a reading of the following non-restrictive description given solely by way of example of embodiments of the method of the invention and with reference to the accompaying drawings on which.

DDETAILED ESCRIPTION OF THE PREFERRED EMBODIMENTS

Figures 1, 8, 9A, 10A, 10B:
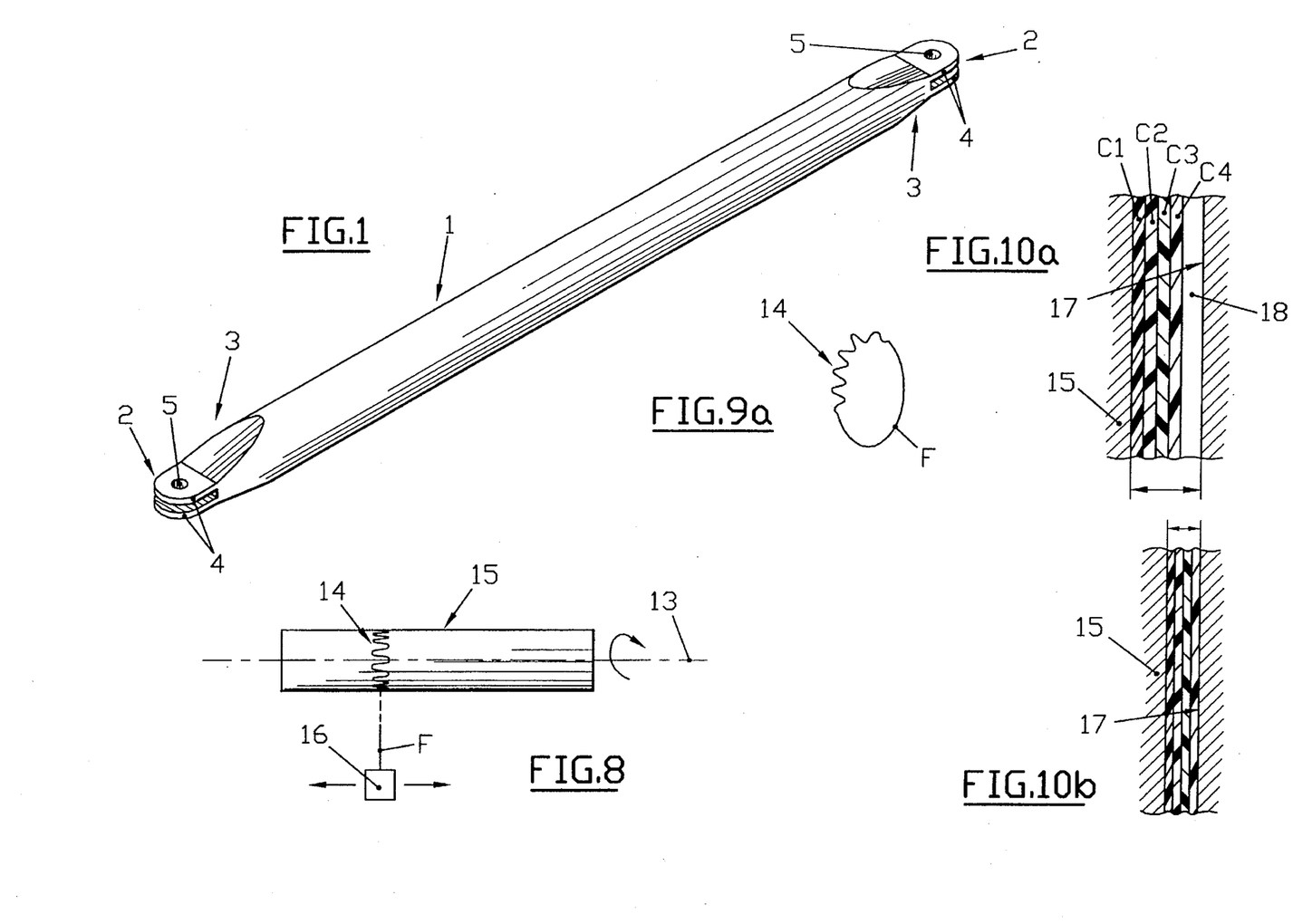
FIG. 1 is a perspective view of a connecting rod with caps able to be embodied by means of the method of the invention.
FIG. 8 diagrammatically shows the way of winding a fiber circumferentially on the mandrel along a sinuous line.
FIGS. 9a to 9f represent various diagrams for placing circumferential fibers in accordance with the invention.
FIGS. 10a and 10b illustrate the flattening of the concentric fiber layers against the internal wall of the shaper following expansion of the mandrel.

FIG. 1 diagrammatically shows a perspective view of a standard connecting rod able to be embodied with the method of the invention and formed of a hollow cylindrical running portion 1 having a wall with a constant thickness and connecting two identical strap-shaped connecting rod heads 2 being inscribed in a cylinder with a diameter slightly smaller than that of the running portion 1, the straps being connected to the latter by a transition portion 3 with a varying section and increasing wall thickness, thus widening the running portion 1 at the strap 2. Each strap 2 is formed of two parallel cheeks 4 with a rectangular section and pierced with two opposing holes 5.

Figure 2:
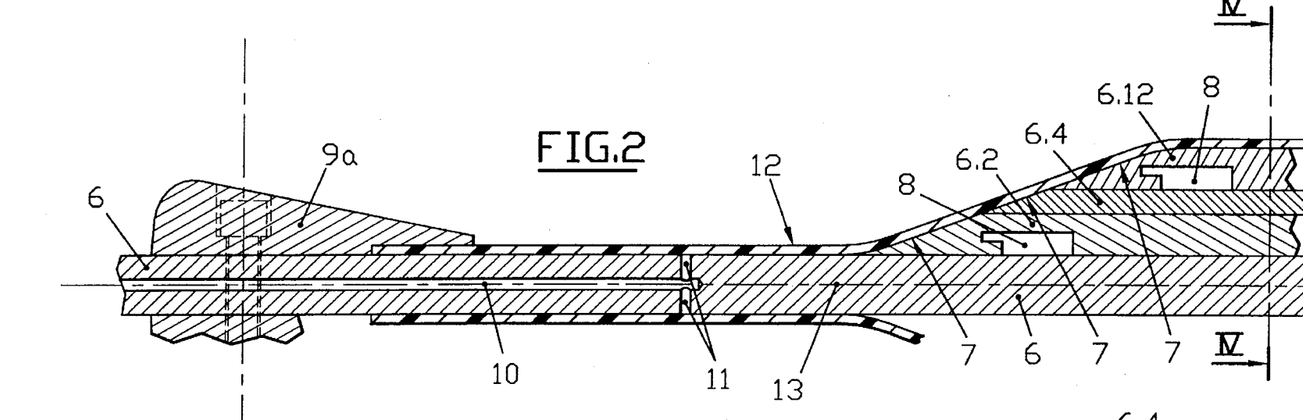
FIG. 2 is a coaxial vertical cutaway partial view of an expansible mandrel able to be extracted via dismantling according to the invention.
Figure 3:
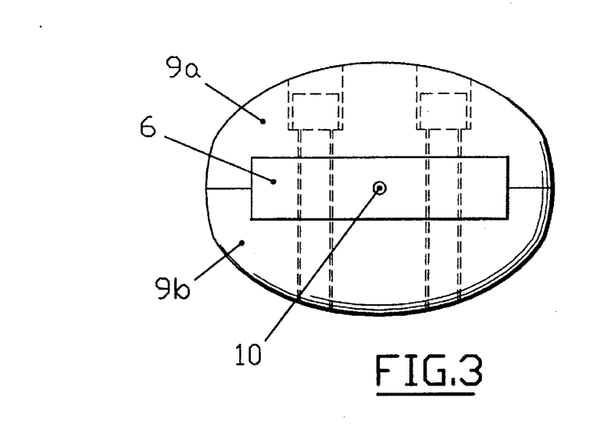
FIG. 3 is a lefthand view of the device of FIG. 2.
Figure 4:
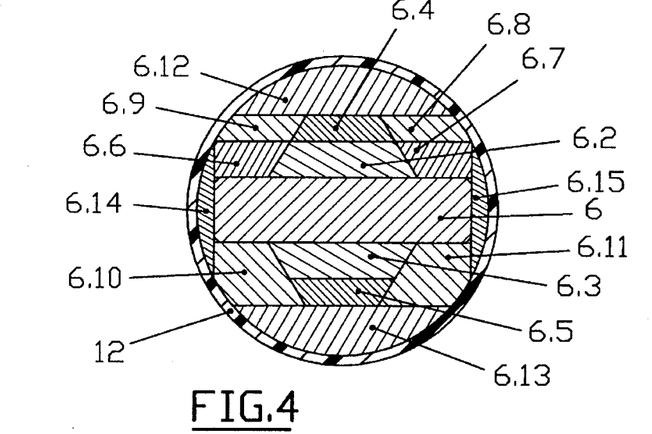
FIG. 4 is a cutaway view of the mandrel perpendicular to its axis and along the line IV—IV of FIG. 2.

FIGS. 2 to 4 diagrammatically represent a suitable standard mandrel according to the method of the invention for embodying a connecting rod of the type of FIG. 1 and made of a monoblock composite material.

In accordance with the invention, this mandrel is shaped by a recoverable tool composed of a set of parts, possibly metallic, able to be assembled and disassembled in,the way of a three-dimensional puzzle, the parts being dimensioned and configured so as to firstly constitute in an assembled condition a volume approximately corresponding to the internal volume of the hollow connecting rod of FIG. 1, and secondly enable all the parts to be extracted after polymerization of the resin of the fibers placed on the mandrel, this extraction being effected via one of the open ends of the connecting rod between the cheeks 4.

To this effect, the mandrel includes a central bar 6 with a constant rectangular section.

Various configured, dimensioned and positioned parts are mounted on this bar 6 at the periphery (FIG. 4) so as to define, once all the parts are in place, a volume approximately corresponding to that of the running portion 1 of the connecting rod and transition portions 3.

FIG. 4, which is a section along the line IV—IV corresponding to the cylindrical running portion 1 of the connecting rod, shows that the mandrel is formed opposite this running portion of a central part (bar 6) surrounded by parts with various sections (trapezoidal, lenticular or other shades) marked $6_2$ to $6_{15}$, the index figure indicating the order according to a particular sequence for removing the part in question, the first part removed being the bar 6.

FIG. 2 does not show the parts placed under the central bar 6.

The parts $6_2$ to $6_{15}$ have a constant section, except at the ends, facing the transition portions 3 of the connecting rod where the parts have straight or bulged slanted faces (7) in alignment.

Some of the parts ($6_2$, $6_{12}$) may have on their face orientated towards the central bar 6 recesses 8 enabling a hook to be engaged to subsequently separate with a view to extracting the part.

The mandrel opposite the straps 2 of the connecting rod is solely constituted by the bar 6.

Shells 9a, 9b are conventionally placed at the two ends of the bar 6, the shells surrounding the bar 6 and constituting return pears ensuring the winding loop on return of the head for placing the fibers which may be carbon fibers preimpregnated with a suitable resin.

The bar 6 is conventionally provided at its ends with an intake boring 10 with air under pressure via perforations 11 in the space between the mandrel and a bladder 12, such as a tubular silicon sleeve joined and compressed on the mandrel between the two return pears (9a, 9b).

In order to shape the mandrel from the assembling parts (6, $6_2$ to $6_{15}$), the assembled bundle of parts may be placed horizontally on two brackets, the bundle being supported by belting with the aid of elastic links, thus providing the time for joining the bladder 12 above the mandrel. The elastic links are gradually removed on joining of the bladder which then elastically retains the links.

The shells 9a, 9b are placed last above the ends of the bladder 12.

The mandrel of FIG. 2 is ready to be coated with fibers. To this effect, it is conventionally placed between two poppets of a system for driving in rotation the mandrel around the axis 13 of the bar 6.

The fibers are conventionally placed by winding and/or laying down, as described in the French patent application filed in the name of the Applicant on 26 May 1993 under the No 93 06613.

However, having regard to the radial expansion to which the fibers placed on the mandrel are subjected and in accordance with the invention, especially the fibers wound or laid down circumferentially or approximately circumferentially, this placing is effected according to a particular process by means of which the fibers form on the mandrel a sinuous line or constituted by discontinuous elements allowing for the radial expansion of all the concentric layers of fibers.

According to a first embodiment, in the case of an individual fiber formed of continuous agglomerated elements, this fiber is wound without any solution of continuity but by forming circumferentially on the mandrel a sinuous line, such as a sinusoidal line, as shown at 14 on FIG. 8 where the mandrel is symbolized at 15 with its spin axis 13 and the winding head 16.

This placing along a sinusoidal line 14 is easy to implement by constraining the head 16 to an alternate movement in a direction parallel to the axis 13 of the mandrel and with an amplitude adjustable on both sides of the normal winding position of the fiber F.

The amplitude of the sinusoidal placing of the fiber F on the mandrel 15 has been deliberately exaggerated in FIG. 8. It is possible to vary both the amplitude of the oscillations of the sinusoid 14 and its pitch according to various parameters, such as the nature of the fiber, the degree of inclination of the general axis of the fiber in place on the mandrel 15 with respect to the axis 13, the amplitude of the subsequent radial expansion of the mandrel, the diameter of the local surface where the fiber is placed, as well as the row or distance with respect to the mandrel from the layer of fibers in question in the stacking of concentric layers locally defining the thickness of the wall of the article embodied, such as the connecting rod of FIG. 1.

It is to be noted that for a given angle of inclination of the fiber with respect to the axis of the mandrel, the amplitude of the undulations of the sinusoid 14 shall differ according to the row of the layer in question in the stacking of concentric layers. FIG. 10a shows a stacking of four successive concentric layers C1 to C4 on a mandrel 15 and the internal wall 17 of the shaper on which the layers are to be pressed upon expansion of the mandrel. This figure also shows at 18 the clearance between about 0.5 and 1 mm existing between the layers C1 to C4 and the shaper at the time the latter is placed and before expansion of the mandrel 15.

FIG. 10b shows the same layers C1 to C4 after expansion of the mandrel.

The outer layer C4 is packed against the wall 17 of the shaper and the other layers C1 to C3 are packed against the layer C4, although displacement in the direction of the shaper is that much more extensive when the layer is closest to the mandrel.

As a result, it is necessary for a given angle of inclination with respect to the axis of the mandrel of the fibers of the various layers to wind the fiber of the layer C1 by giving it a larger undulation than for the fiber of layer C2. Similarly, the undulations of the fiber on the layer C2 shall be greater than those of the fiber of C3, and so on.

By means of calculation, it is a simple matter to determine the undulation amplitudes of the fibers of the various layers so that, when moving from a non-expanded state of the mandrel of FIG. 10a to the expanded state of FIG. 10b, the circumferential fibers lose all their undulations and become purely helicoid with contiguous spires. The winding of the various layers may then be easily programmed and controlled by a computer.

In this case, it is to be noted that on placing of the shaper on the mandrel coated with fibers where the clearance 18 would be nil or extremely small, it is possible to embody the final layer by means of fibers without any undulations, the fibers and being purely or approximately circumferential.

What has been previously stated regarding the cylindrical portion of the mandrel is also applicable to the portions (7) corresponding to the transition zones 3 of the connecting rod, as well as to the portions of the mandrel (6) corresponding to the straps 2.

Not only placed are the fibers wound circumferentially on the mandrel thus forming undulations, but also the fibers wound at an angle of less than 90° with respect to the axis of the mandrel, and the more this angle is lower than 90°, the more the undulations have a reduced amplitude. For a fiber winding angle of less than about 45°, it is possible to avoid making the fibers undulate, the component according to the axis of the fibers of the radial direction of the mandrel being able to be supported by the fibers.

The undulations of the sinusoid 14 may extend over the entire circumference of the mandrel or solely over one fraction of a turn, as shown on FIG. 9a.

According to a second implementation of the method of the invention and still concerning the case of an individual fiber F, the circumferential fiber is not undulated, the latter rather being placed end to end by sections or by partial covering, as shown on FIGS. 9b to 9e.

Figure 9B:
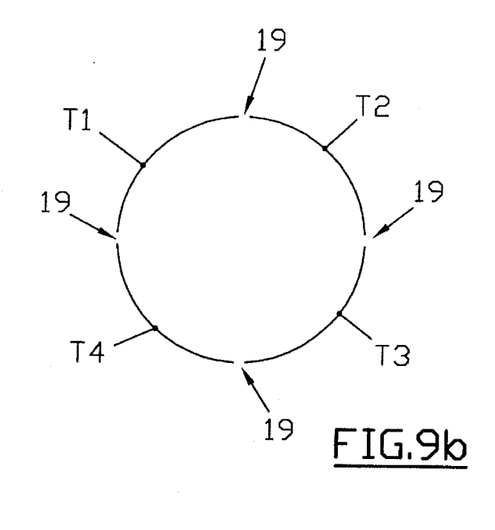

FIG. 9b shows a turn of a mandrel of a quarter of a circle and covered by four fiber sections respectively T1 to T4 placed end to end. The following adjacent spire on the mandrel shall be established in the same way, but it is preferable to ensure there is an offsetting at the level of the gaps 19 so that they are not aligned on the generating lines of the cylinder of the wound volume. Similarly, from one layer to the next concentric layer, a disposition shall be effected so that the intervals 19 of the layers are not superimposed.

Figure 9C:
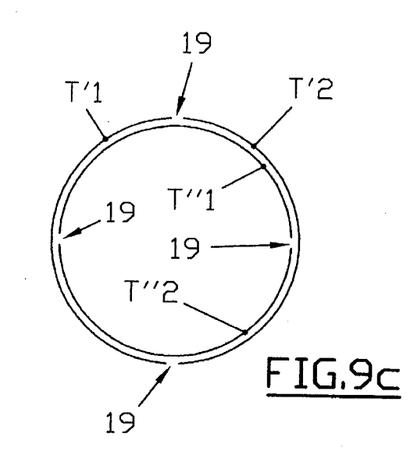

FIG. 9c shows two end to end sections T'1 and T'2 each with a semicircumference and two identical sections T"1 and T"2 with an adjacent spire but offset angularly, for example with a quarter of a turn so as to avoid the alignments of the gaps 19. A given disposition is recommended for the upper concentric layer whose two sections (not shown) shall be mounted astride those of the layer of the bottom.

Figure 9D:
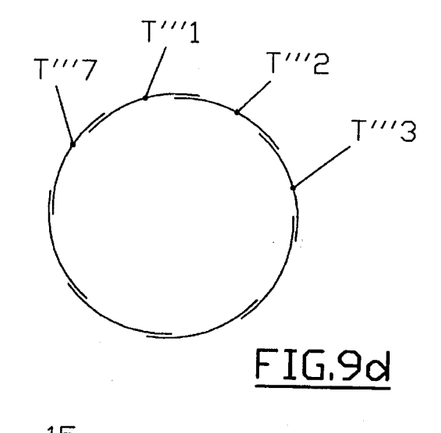

In FIG. 9d, the sections with a complete spire (T'''1, T'''2, . . . T'''7) have mutual partial covering. In the following layer, the same covering shall be observed but with an offsetting so as to allow for better distribution of the thickness differences when moving from one section to the next one.

Figure 9E:
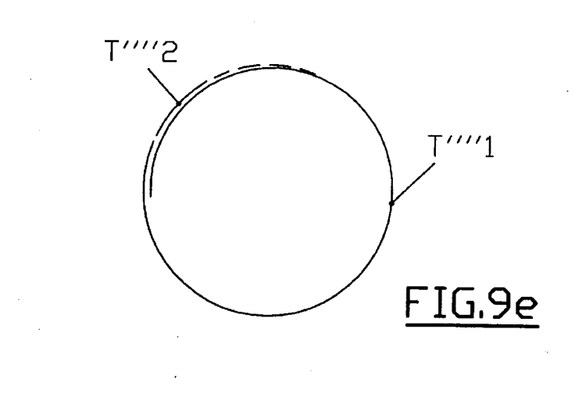

On FIG. 9e, a single fiber section T""1 extends over an arc of a circle greater than 360°, the next section T""2 being placed end to end and having the same length as the first one.

A large number of combinations of arrangements of fiber sections are possible and may be embodied automatically by a fiber sectioning laying down head controlled by a computer. In order to place these fibers, it is possible to use the laying down/winding machine described in said French patent application No 93 06613.

As for the fibers placed with undulations, the laying down technique by sections is applicable to windings of circumferential fibers or forming with the axis of the mandrel a large angle of more than 45° and able to justify using this technique so as to absorb the radial expansions of the mandrel.

Figure 9F:
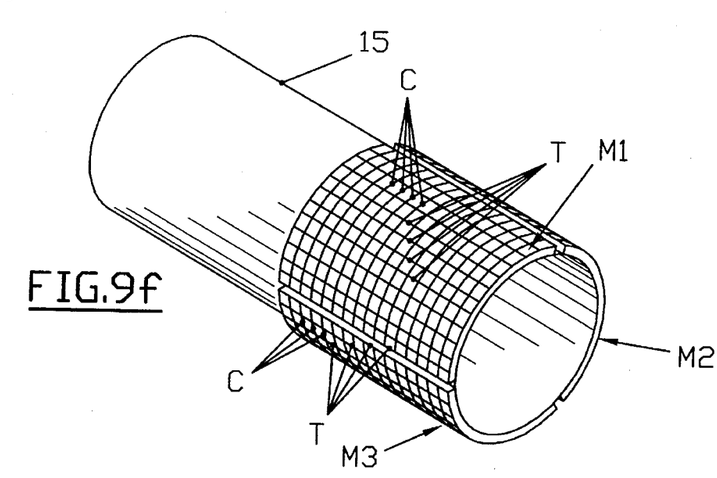

FIG. 9f shows the case of non-individual circumferential fibers but formed, for example, of warp yarns C of a piece of fabric with preimpregnated fibers. To this effect, three fabric pieces are cut for example, shown at M1, M2 and M3, with suitable dimensions and are placed by draping on the mandrel 15 end to end and so that the warp yarns are disposed circumferentially to the mandrel. Thus, the warp yarns C of the three pieces M1 to M3 disposed approximately end to end over the entire circumference of the mandrel behave as the end to end sections T1 to T4 of the individual fibers of FIG. 9b and absorb the diameter expansion of the mandrel 15, whereas the weft yarns T shall be insensitive to this.

The pieces M1 to M3 may thus be mutually partially covered like the sections of FIG. 9d or according to the diagram of FIGS. 9c and 9e.

The fabric pieces M1 to M3 have been dimensioned and configured according to the local shapes of the mandrel 15 to which they are to be applied.

The fibers may also be non-individual and constituting a unidirectional fabric, that is formed of agglomerated unidirectional fibers.

This fabric may be cut to appropriate dimensions and shapes like the pieces M1 to M3 referred to above and put in place by draping on the mandrel at the desired locations by placing the fibers circumferentially or along any other angle of inclination with respect to the axis of the mandrel.

It is also possible to use "wool yarn" type fibers whose constitution authorizes a winding and/or ordinary laying down, that is without any undulations or sectioning, owing to the fact that on expansion of the mandrel, the relatively short individual filaments constituting the sliver of yarn are able to slide by a certain extent with respect to one another in the direction of their axis.

Figure 5:
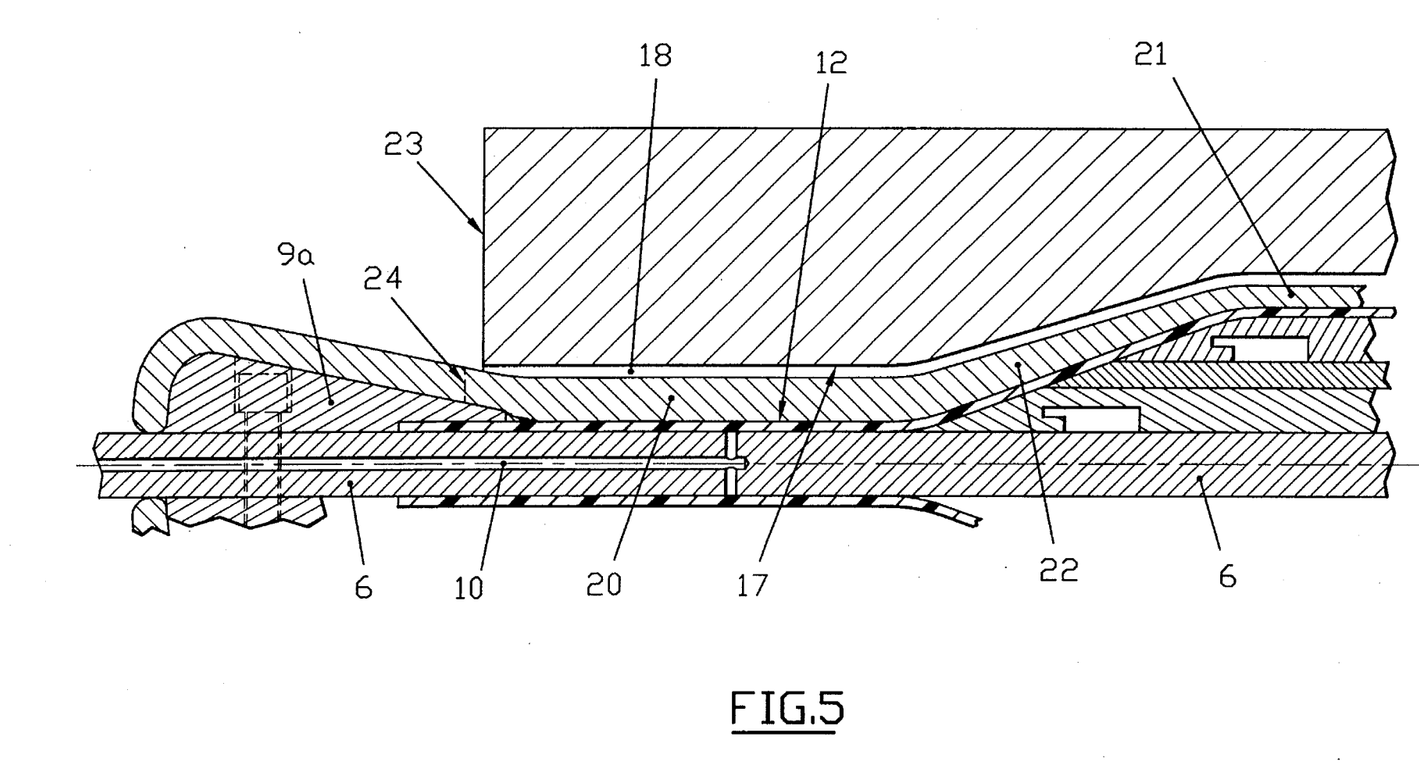
FIG. 5 shows the mandrel of FIG. 4 after winding and placing a shaping mould.

FIG. 5 shows the mandrel of FIG. 2 coated with fibers constituting a connecting rod wall with a varying thickness at 20 opposite the future straps 2 wider than at 21 opposite the future running portion 1, the transition portion 22 having a decreasing thickness from the strap zone (20) as far as that (21) of the running portion.

The fibers are placed along the zones (20, 21, 22) by winding or laying down or by the draping of fabric pieces so as to embody the desired thicknesses and satisfy the technical specifications. In all these zones 20 to 22, any fiber disposed circumferentially on the mandrel or with a large angle with respect to the axis 13 shall be placed in accordance with the method of the invention.

Once the fibers are placed, a shaping mould formed of two symmetrical half portions 23 fully surrounds the portions 20 to 22 (FIG. 5), the internal wall 17 preferably being coated with a protective film or a layer of a mould removal agent.

The zone of the fibers wound around the end pears (9a, 9b) is sectioned at 24 and removed as well as the shells 9a, 9b so as to place (FIG. 6) the sealing flanges 25 on the shaper 23.

Figure 6:
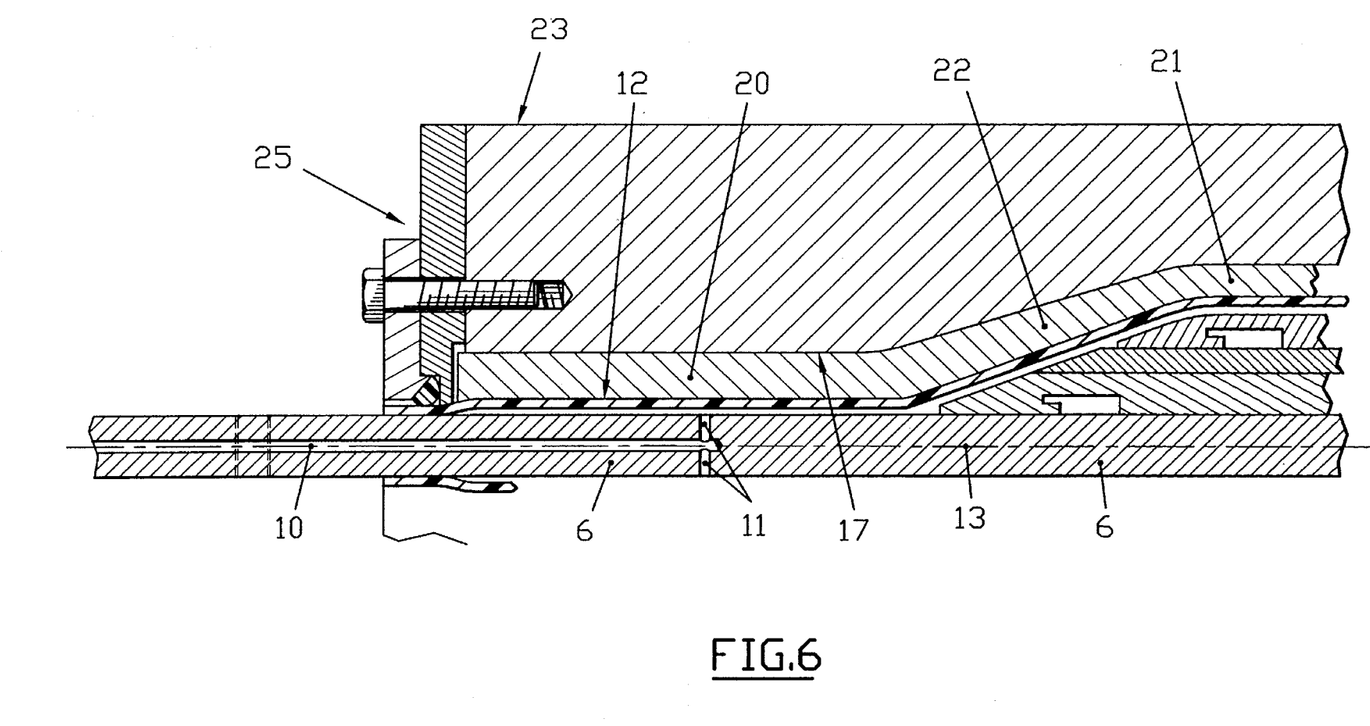
FIG. 6 shows the device of FIG. 5 in the mandrel expansion phase.

The bladder 12 is thus grasped in a sealed way between the bar 6 and the flanges 25 which then makes it possible to send air under pressure via the borings 10, 11 into the space between the mandrel and the bladder 12.

Inflation of the bladder 12 compresses the layers of fibers (20 to 22) against the internal wall 17 of the shaper 23, this inflation being carried out after having raised the temperature of the composite material to about 80° C. so as to soften the resin.

The pressure of the air sent into the bladder 12 is progressive and may reach several bars. It is carried out whilst raising the temperature of the composite material to about 160° C., depending on the nature of the resin.

Figure 7:
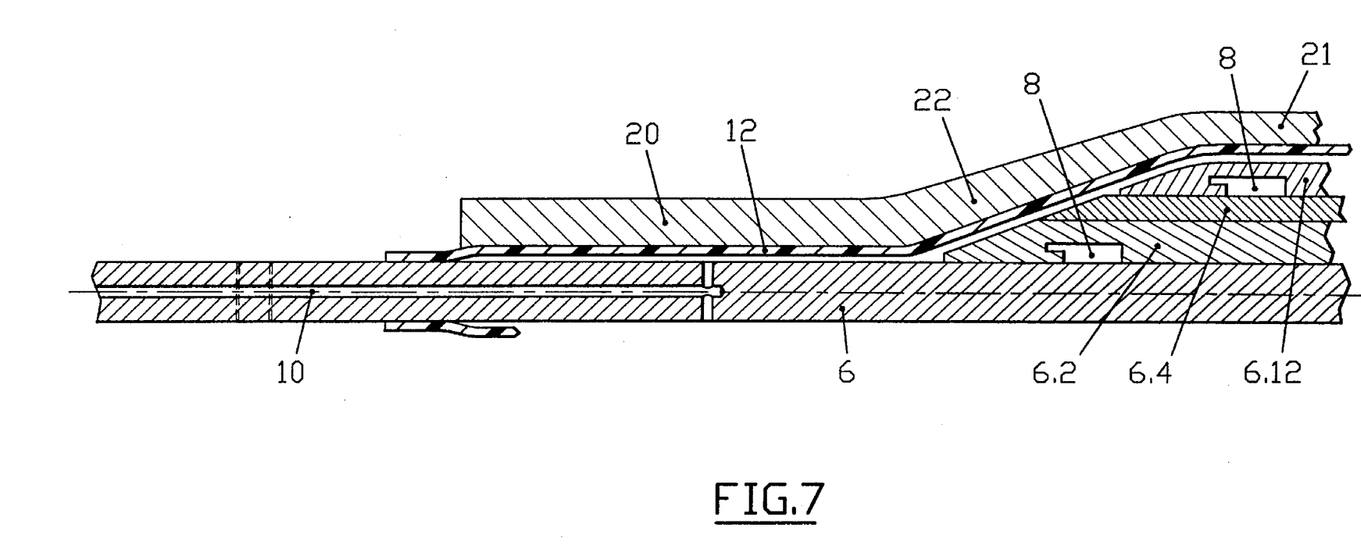
FIG. 7 illustrates the mandrel being removed from the mould and its contraction.

Once the polymerization cycle has been completed, the flanges 25 and the shaper 23 are removed (FIG. 7) and then the mandrel portions (6, 6₂ to 6₁₅) are extracted by observing the order shown in FIG. 4.

First of all, the bar 6 is removed, which enables the pieces 6₂, 6₃ to be offset in the space previously occupied by the bar 6 and removed in the same way. All the pieces thus pass into the tunnel with a rectangular section of one of the end portions 20 of the monolithic composite unit.

Once all the pieces are removed, the bladder 12 may be extracted, again in the same way, and may be subsequently reused.

Then machining is made of the dimensions of the straps 2 of the connecting rod in the portions 20 together with finishing operations, such as facing, boring of the holes 5, inspection, painting, etc.

Polymerization is effected by baking but could possibly be carried out by any other means, such as ionization.

The embodied connecting rod has, in particular, a remarkable surface finish owing to the fact of compressing the outer layer of fibers against the internal face of the shaper 23. Moreover, the compacting of the monolithic composite mass of the connecting rod is excellent.

Of course, the connecting rod shall be able to have the winding or laying down characteristics of the fibers described in the French patent application No 93 06614 filed on 26 May 1993 in the name of the Applicant by varying, for example, on a given layer of fibers the angle of inclination of the fiber along the zone of the connecting rod, the glue film or layer of inserted glass fabric, a different number of fibers along the zone of the connecting rod, local reinforcement elements formed of draped fabric pieces, etc.

The method of the invention is applicable to the embodiment by winding and/or laying from any hollow body, possibly a revolution body and possibly having an axis centered or moved out of center, provided the item comprises at least one opening allowing for the placing and extraction of a mandrel. For example, it is possible to thus embody spherical or cylindrical bottles or vessels with a bellied bottom or hollow connecting rods comprising a strap at one end a simple flattened head at the other end.

It is also possible to embody hollow articles with flat walls, for example boxes or chambers with a square, rectangular or polygonal section.

Finally, it is possible to use an extractible mandrel in another way without adversely affecting the integrity of the embodied composite article and enabling the bladder to be inflated, such as a mandrel in a meltable material, such as the material known as "arenyl". The French patent application No 93 06614 describes "arenyl" as a meltable material of the known type comprising sand mixed with an appropriate binder and being hot water soluble.

The method of the invention allows for mechanization of industrial production ensuring extremely good reproduction.

Finally, the invention is not merely limited to the implementations of the method and embodiment examples described above, but on the contrary covers all possible variants, especially as regards the nature of the preimpregnated fibers, the constitutive characteristics of the article in question embodied (number of layers of fibers, nature and thickness of layers, winding and/or laying down/draping of fiber or fabric characteristics, intermediate glue films, as well as the shapes and dimensions of the composite hollow article which may be open at one end or two opposing ends.

We claim:

1. A method for forming hollow articles made of composite material including at least one access orifice by at least one of winding and laying down fibers on an expansible mandrel, said method comprising:

placing preimpregnated fibers on an expansible, extractable mandrel having a longitudinal axis formed by the at least one of winding and laying down of the preimpregnated fibers on the mandrel, the preimpregnated fibers being placed at any angle with respect to the longitudinal axis, at least the placing of circumferential fibers at an angle of approximately 90° with respect to the longitudinal axis forming on the mandrel one of a sinuous line and plural discontinuous elements, the one of a sinuous line and plural discontinuous elements enabling the preimpregnated fibers to be expanded circumferentially during radial expansion of the mandrel; and expanding the mandrel inside a shaper while polymerizing the preimpregnated fibers.

2. The method according to claim 1, wherein the preimpregnated fibers comprise individual fibers, and the circumferential fibers form a sinuous line.

3. The method according to claim 2, comprising driving a head with an alternate movement in a direction parallel to the longitudinal axis to effect winding of the preimpregnated fibers.

4. The method according to claim 2, wherein undulations of the sinuous line extend over at least one of a whole turn of a circumferential winding and a fraction of a turn of a circumferential winding.

5. The method according to claim 4, wherein the undulations comprise an amplitude, and the amplitude varies from one fiber layer to the next.

6. The method according to claim 5, wherein the undulations comprise a pitch, and the pitch varies from one fiber layer to the next.

7. The method according to claim 5, wherein the preimpregnated fibers are placed from an inner layer to an outer layer, and the amplitude is progressively reduced in a direction towards the outer layer.

8. The method according to claim 7, wherein, when substantially no clearance or no clearance exists between the outer layer and the shaper prior to expanding the mandrel, the outer layer is formed of fibers without any undulations and circumferential or substantially circumferential.

9. The method according to claim 2, wherein preimpregnated fibers are additionally placed with an angle of inclination to the longitudinal axis and forming at least a partially sinuous line comprising undulations, the undulations comprising an amplitude, and the amplitude varies according to the angle of inclination.

10. The method according to claim 9, wherein the undulations comprise a pitch, and the pitch varies according to the angle of inclination.

11. The method according to claim 2, wherein preimpregnated fibers are additionally placed with an angle of inclination to the longitudinal axis and forming at least a partially sinuous line comprising undulations, the undulations comprising an amplitude, and the amplitude varies according to a distance to the longitudinal axis from a local surface where the preimpregnated fibers are placed.

12. The method according to claim 11, wherein the undulations comprise a pitch, and the pitch varies according to the distance to the longitudinal axis from a local surface where the preimpregnated fiber is placed.

13. A method for producing hollow articles made of composite material including at least one access orifice by at least one of winding and laying down fibers on an expansible mandrel, said method comprising:

placing preimpregnated fibers on an expansible, extractable mandrel having a longitudinal axis formed by the at least one of winding and laying down of the preimpregnated fibers on the mandrel, wherein the placing of the preimpregnated fibers includes placing fibers at any angle with respect to the longitudinal axis, at least the fibers placed at an angle of approximately 90° angle with respect to the longitudinal axis forming on the mandrel one of a sinuous line and plural discontinuous elements, said one of a sinuous line and plural discontinuous elements enabling the preimpregnated fibers to be expanded circumferentially during radial expansion of the mandrel; and expanding the mandrel inside a shaper while polymerizing the preimpregnated fibers.

14. The method according to claim 13, wherein the preimpregnated fibers comprise the plural, discontinuous elements, the discontinuous elements comprising individual fibers formed of slivers of relatively short overlapped filaments placed by at least one of winding and laying down, the plural, discontinuous elements.

15. The method according to claim 13, wherein the preimpregnated fibers comprise the plural, discontinuous elements, the discontinuous elements comprising individual fibers placed by at least one of winding and laying down by sections according to section lengths extending over at least one of a fraction of a turn of the mandrel, a complete turn of the mandrel and slighter greater than one turn of the mandrel.

16. The method according to claim 15, wherein the sections are placed end to end.

17. The method according to claim 16, wherein from one layer of winding around the mandrel to a next winding or one layer of fibers to a next layer of fibers, the sections are angularly offset so as to distribute gaps separating end to end sections throughout the composite material.

18. The method according to claim 15, wherein the sections mutually overlap lengthwise.

19. The method according to claim 18, wherein from one layer of winding around the mandrel to a next winding or one layer of fibers to a next layer of fibers, the sections are angularly offset so as to distribute thickness differences due to the overlap throughout the composite material.

20. The method according to claim 13, wherein the preimpregnated fibers comprise warp yarns or weft yarns of a fabric, and pieces of fabric are cut to suitable shapes and dimensions, and the pieces of fabric are draped on the mandrel so that the warp yarns or weft yarns are disposed at least one of circumferentially and substantially circumferentially to the mandrel.

21. The method according to claim 20, wherein the fabric pieces extend over a complete turn of the mandrel with partial mutual overlapping or end to end positioning.

22. The method according to claim 13, wherein the preimpregnated fibers comprise fibers of a unidirectional fabric cut to suitable shapes and dimensions, and draped on the mandrel so that the fibers are disposed at least one of circumferentially and Substantially circumferentially to the mandrel.

23. The method according to claim 22, wherein pieces of the unidirectional fabric extend over a complete turn of the mandrel with partial mutual overlapping or end to end positioning.

24. The method according to claim 13, wherein the mandrel comprises a recoverable mandrel.

25. The method according to claim 13, wherein the mandrel comprises a plurality of pieces cooperating to form a three-dimensional array, the plurality of pieces comprising shapes and dimensions so as to enable, after polymerization, for extraction of the mandrel by removing pieces of the plurality of pieces according to a pre-established sequence of pieces via the at least one access orifice of a hollow article.

26. The method according to claim 25, comprising an inflatable bladder covering the mandrel on which the preimpregnated fibers are to be placed.

27. The method according to claim 13, wherein the sinuous line includes undulations, and the undulations extend over at least one of a whole turn of the mandrel and a fraction of a turn of the mandrel.

28. The method according to claim 27, wherein the undulations comprise an amplitude and a pitch, and at least one of the amplitude and the pitch varies from one fiber layer to the next.

29. The method according to claim 28, wherein the preimpregnated fibers are placed from an inner layer to an outer layer, and the at least one of the amplitude and the pitch variations are progressively reduced in a direction toward the outer layer.

30. The method according to claim 29, wherein when one of substantially no clearance and no clearance exists between the outer layer and the shaper prior to expanding the mandrel, the outer layer is formed of fibers without any undulations and circumferential winding.

31. The method according to claim 27, wherein the undulations comprise an amplitude and a pitch, and at least one of the amplitude and the pitch varies according to an angle of inclination.

32. The method according to claim 27, wherein the undulations comprise an amplitude and a pitch, and for a given angle of inclination of the fibers with respect to the longitudinal axis, at least one the of the amplitude and the pitch varies according to a distance to the longitudinal axis from a local surface where the preimpregnated fibers are placed.

33. The method according to claim 53, said method further comprising the step of determining characteristics of the undulations by calculation, such that once the mandrel has fully expanded, the undulations extending over the at least one of a whole turn of the mandrel and a fraction of a turn of the mandrel lose their sinuosity and form a helical path.

* * * * *